Patented Jan. 4, 1949

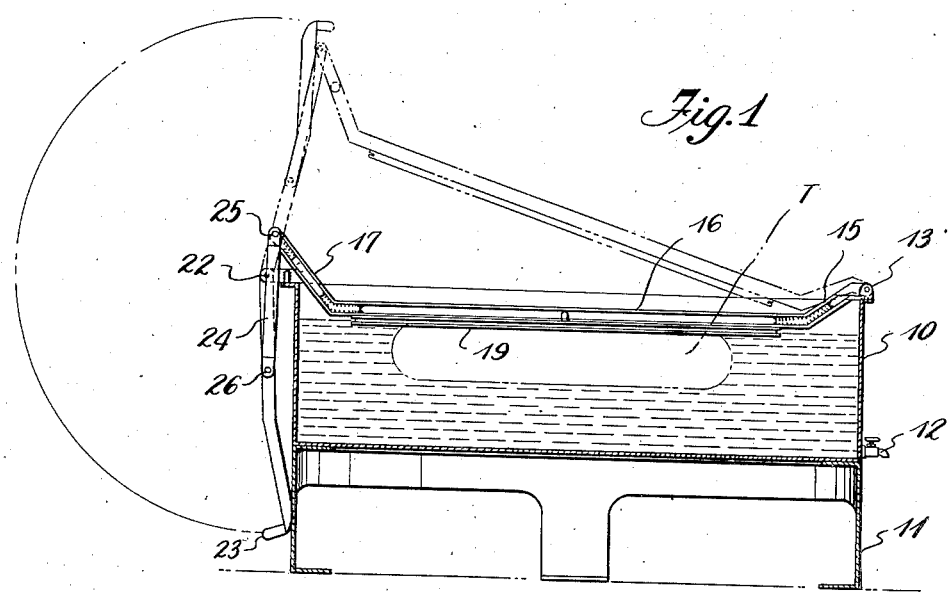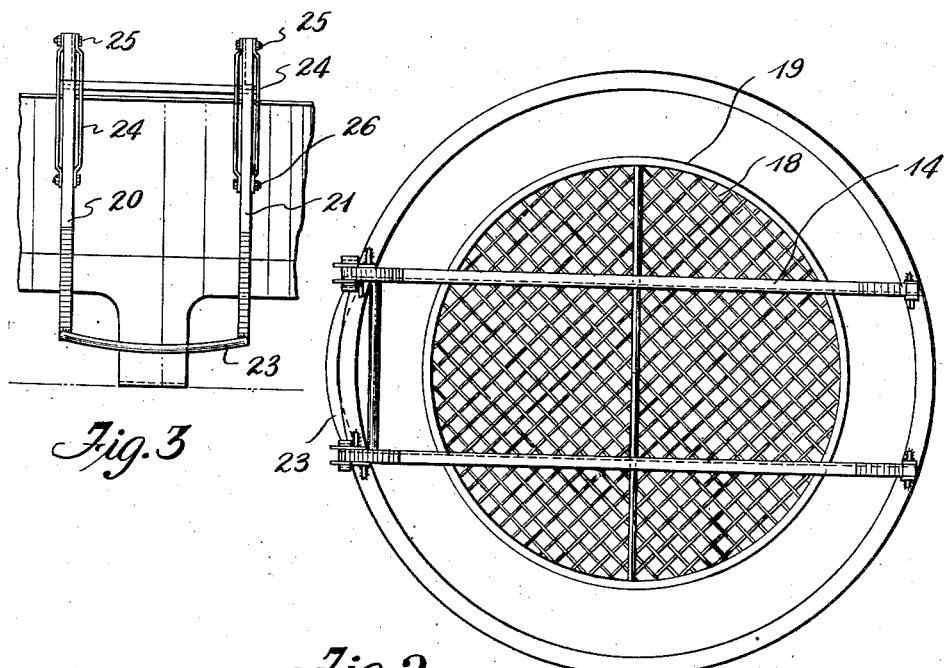

2,458,126

UNITED STATES PATENT OFFICE 2,458,126

TIRE TUBE TESTER

Willard Abner, Burbank, Calif.

Application January 26, 1946, Serial No. 643,655

4 Claims. (Cl. 73—49)

This invention relates to a device for testing tire tubes.

In determining the location of a leak or leaks in the inner tubes of pneumatic tires it is desirable to inflate the tube and to submerge it in a liquid such as water and detect the presence and location of the leaks by the bubbles issuing therefrom. After tubes have been repaired it is also desirable to pressure test them to determine whether all leaks have been fully repaired. In so doing, the tube is inflated and submerged in the water to make such a test in a similar manner.

An object of the present invention is to provide an improved device for maintaining a tube that is to be tested submerged in the liquid and at the same time permit of ready inspection of the indicative bubbles.

Another object of the invention is to provide a tube tester consisting of a tank adapted to contain water and having a cover hingedly mounted thereon which is depressed into the tank so that it will maintain an inflated inner tube entirely submerged in the water, the cover having a large central portion provided by screen through which the indicative bubbles may be observed and a novel and simple locking device for holding the cover down against the buoyant effect of the tube.

With the foregoing and other objects in view, which will be made manifest in the following detailed description and specifically pointed out in the appended claims, reference is had to the accompanying drawings for an illustrative embodiment of the invention, wherein:

Figure 1 is a diametrical section through the improved tire tube tester;

Fig. 2 is a top plan view of the same; and

Fig. 3 is a partial view in front elevation illustrating the locking device for the cover.

Referring to the accompanying drawings wherein similar reference characters designate similar parts throughout, the improved tire tube tester comprises a suitable tank 10 preferably equipped with supporting legs 11 and a drain valve 12. This tank is in the form of a shallow cylinder of adequate diameter to accommodate the largest conventional inner tube for pneumatic tires. At the back of the tank there are hingedly mounted as at 13 two forwardly extending channel irons 14 which are bent downwardly from the hinge as at 15, then forwardly as at 16, and finally upwardly as at 17. Secured to these channel irons is a circular section 18 of heavy wire mesh which may be retained within a frame 19 that is secured to the underside of the channel irons. This circular section of wire mesh extends over a substantial portion of the cross-sectional area of the tank and when the cover formed thereby is in its closed position this section is disposed below the normal water level in the tank so that a tire tube T positioned in the tank will be completely submerged thereby. At the forward side of the tank two levers 20 and 21 are pivotally mounted as at 22. These levers are connected together by handle 23 to cause them to move in unison. Links 24 are pivotally connected as at 25 to the forward ends of the channel irons 16 and to the levers at 26. As shown in Fig. 1, the pivotal connection 22 is disposed forwardly of the line connecting the pivotal connections 25 and 26 so that when the cover for the tank is in closed position the links 24 pass over center and tend to self-lock the cover in closed position to retain the tube T submerged despite its buoyancy. By swinging the handle 23 and consequently the levers 20 and 21 upwardly into the dotted line position shown in Fig. 1, the links 24 elevate the cover and as the links tend to swing rearwardly the cover is held in its uppermost position to permit of removal or insertion of the tube T.

In performing a test on a tube, the tube is inflated and positioned on the liquid within the tank. The cover is then lowered by swinging the handle 23 downwardly into the full line position shown in Fig. 1, causing the tube to be depressed and submerged in the liquid. Leaks are detected from the bubbles of air issuing therefrom through the water which are readily visible through the wire mesh. On completion of the test the cover is lifted and the tube removed.

From the above-described construction it will be appreciated that the improved tire tube tester provides a means for completely and entirely submerging the tube in the water to determine the presence of leaks and at the same time facilitates insertion and removal of the tube.

Various changes may be made in the details of construction without departing from the spirit and scope of the invention as defined by the appended claims.

I claim:

1. A tire tube tester comprising a tank, a cover hingedly mounted thereon, a pair of levers pivotally mounted upon the tank diametrically opposite the hinges for the cover, a handle connecting the levers and links connecting the cover to the levers intermediate their ends.

2. A tire tube tester comprising a tank, a cover hingedly mounted thereon, a pair of levers pivotally mounted upon the tank diametrically opposite the hinges for the cover, a handle connecting the levers and links connecting the cover to the levers intermediate their ends, the links being so arranged as to pass over center with respect to the pivotal connection between the levers and the tank.

3. A tire tube tester comprising a tank, a pair of channel irons pivotally connected to the tank, said channel irons being bent downwardly, forwardly, and then upwardly, a section of wire mesh secured to the undersides of the channel irons, and arranged below the normal level of liquid in the tank, a pair of levers pivotally mounted upon the tank, a handle connecting the levers, and links pivotally connected to the forward ends of the channel irons and to the levers intermediate their ends, said links being so arranged as to pass over center with relation to the pivotal connection between the levers and the tank.

4. A tire tube tester comprising a tank adapted to contain liquid and within which a tube to be tested may be positioned, means hingely connected to one side of the tank adapted to engage the tube to submerge it in the liquid, handled lever means pivotally mounted on the opposite side of the tank, and linkage means pivotally connected to the submerging means and to the lever means intermediate the ends of the lever means.

WILLARD ABNER.

REFERENCES CITED

The following references are of record in the file of this patent:

UNITED STATES PATENTS

| Number | Name | Date |
| --- | --- | --- |
| 1,867,015 | Lundy | July 12, 1932 |